(12) United States Patent
Susai et al.

(10) Patent No.: US 8,311,174 B1
(45) Date of Patent: Nov. 13, 2012

(54) PERSISTENT SYNCHRONIZATION WITHIN A MEDIA ORIENTED SYSTEMS TRANSPORT NETWORK

(75) Inventors: Robert Bellarmin Susai, Hyderabad (IN); Venkata Vamsi Krishna Dhanikonda, Secunderabad (IN)

(73) Assignee: Xilinx, Inc., San Jose, CA (US)

( * ) Notice: Subject to any disclaimer, the term of this patent is extended or adjusted under 35 U.S.C. 154(b) by 1216 days.

(21) Appl. No.: 12/122,224

(22) Filed: May 16, 2008

(51) Int. Cl.
*H04L 7/00* (2006.01)
(52) U.S. Cl. .................. 375/356; 375/376; 370/468
(58) Field of Classification Search .................. 370/235, 370/342, 405, 410, 468; 375/356, 375
See application file for complete search history.

(56) References Cited

U.S. PATENT DOCUMENTS

| | | | |
|---|---|---|---|
| 4,566,098 A | 1/1986 | Gammage et al. | |
| 4,587,651 A | 5/1986 | Nelson et al. | |
| 5,886,992 A | 3/1999 | Raatikainen et al. | |
| 6,683,851 B1 | 1/2004 | Willkie et al. | |
| 7,050,440 B2 | 5/2006 | Colmant et al. | |
| 7,305,487 B2 | 12/2007 | Blumrich et al. | |
| 2004/0047327 A1 | 3/2004 | Chen | |
| 2005/0105662 A1* | 5/2005 | Margules | 375/376 |
| 2007/0064735 A1* | 3/2007 | Hoo et al. | 370/468 |
| 2010/0037084 A1* | 2/2010 | Lloyd | 713/502 |

OTHER PUBLICATIONS

U.S. Appl. No. 12/122,217, filed May 16, 2008, Susai et al.

* cited by examiner

*Primary Examiner* — Leon-Viet Nguyen
(74) *Attorney, Agent, or Firm* — Kevin T. Cuenot (57) ABSTRACT

A method of processing data within a controller for a network can include, while frame lock is not established, detecting a first preamble and a second preamble within a data stream of the network (1210, 1235). Biphase units between the first preamble and the second preamble can be counted (1215). Frame lock can be acquired on the data stream responsive to determining that the first preamble and the second preamble are separated by a number of biphase units corresponding to a frame (1235). A synchronization signal indicating that frame lock has been acquired can be output responsive to acquiring frame lock on the data stream (1240).

20 Claims, 6 Drawing Sheets

PERSISTENT SYNCHRONIZATION WITHIN A MEDIA ORIENTED SYSTEMS TRANSPORT NETWORK

FIELD OF THE INVENTION

Embodiments disclosed herein relate to acquiring and maintaining synchronization within a network. More particularly, embodiments disclosed herein relate to persistent synchronization within a Media Oriented Systems Transport network through the avoidance of unnecessary unlocking conditions.

BACKGROUND OF THE INVENTION

Media Oriented Systems Transport (MOST) is a network configuration that employs a ring topology. MOST was developed for use within automobiles and is intended to provide a robust networking solution able to withstand the harsh operating environment that is characteristic of automobiles. MOST enables the seamless transport of digital audio, video, and packet-based data, and control information among multiple nodes in the network.

The MOST specification, for example version 2.4 as promulgated by the Most Cooperation of Karlsruhe, Germany, defines all seven layers of the ISO/OSI Reference Model for data communication. Within a MOST network, a Timing Master node (master) continuously feeds frames of data into the network or acts as the gate for data. The master generates frames of data at a rate that supports playback of CD quality audio data, DVD encoded video, and/or multimedia content within the MOST network. Other nodes within the MOST network are timing slave nodes that are synchronized by a preamble, which is located within a header portion of the frames.

Data within the MOST network is biphase encoded. Every bit is encoded as two biphase units, e.g., a pair of biphase units. Each new data bit starts, or is indicated by, a level transition in the signal. The level of the signal will change at the second biphase unit of a pair of biphase units that encodes a one bit. The level of the signal will remain the same for the pair of biphase units that encodes a zero bit. Again, the signal transitions at the start of each new bit.

Within a MOST network, data is organized into frames of 64 bytes. The frames are organized into blocks of 16 frames. The blocks are organized into super blocks of 64 blocks. In order to function properly, each node in a MOST network must acquire synchronization at the frame, block, and super block levels. As noted, nodes within the MOST network can maintain synchronization by identifying preambles of frames at expected locations. One characteristic of preambles is that each includes special biphase encoding.

When data is corrupted within a MOST network, a likelihood exists that the corrupted data will include a biphase coding violation. Portions of corrupt data within a MOST network data stream can cause the nodes of the MOST network to lose synchronization. Loss of synchronization can result in user perceivable dropouts in audio, video, or other content being played over the MOST network. When synchronization is lost, significant time and computing resources may be needed to re-acquire synchronization. This may further increase the length of any dropout(s) that occur during media playback over the network.

SUMMARY OF THE INVENTION

The embodiments disclosed herein relate to a network interface controller (controller) for use with a Media Oriented Systems Transport (MOST) network. One embodiment of the present invention can include a method of processing data within a controller for a network. The method can include, while frame lock is not established, detecting a first preamble and a second preamble within a data stream of the network. The method also can include counting biphase units between the first preamble and the second preamble and acquiring frame lock on the data stream responsive to determining that the first preamble and the second preamble are separated by a number of biphase units corresponding to a frame. A synchronization signal indicating that frame lock has been acquired can be output responsive to acquiring frame lock on the data stream.

Acquiring frame lock on the data stream can include determining that no biphase coding violation is detected within the data stream between the first preamble and the second preamble. When frame lock has been acquired, the method can include detecting a biphase coding violation within the data stream, determining that a number of biphase units between the biphase coding violation and a most recent detected preamble located at a frame boundary does not correspond to a frame, and maintaining frame lock according to the most recent detected preamble.

In another aspect, when frame lock has been acquired, the method can include detecting a subsequent preamble within the data stream, wherein the subsequent preamble consecutively follows a prior preamble located at a frame boundary, determining that a number of biphase units between the subsequent preamble and the prior preamble does not correspond to a frame, and maintaining frame lock according to the prior preamble.

When frame lock has been acquired, the method also can include detecting a block preamble within the data stream and, responsive to detecting the block preamble, acquiring block lock on the data stream. In another aspect, when frame lock has been acquired, the method can include detecting a super block preamble within the data stream, determining that block lock has not been acquired on the data stream, and, responsive to detecting the super block preamble, acquiring block lock on the data stream.

When frame lock and block lock have been acquired, the method can include detecting a first super block preamble and a second super block preamble within the data stream and acquiring super block lock responsive to determining that the first super block preamble and the second super block preamble are separated by a number of biphase units corresponding to a super block.

In another aspect, when frame lock and block lock have been acquired, the method can include detecting a super block preamble and a wakeup preamble within the data stream and acquiring super block lock responsive to determining that the super block preamble and the wakeup preamble are separated by a number of biphase units corresponding to a super block.

Another aspect of the present invention can include, when frame lock has been acquired, detecting a biphase coding violation within a frame of the data stream, decoding a portion of the data stream including the biphase coding violation, determining a correct biphase encoding of the portion of the data stream including the biphase coding violation, and biphase encoding the portion of the data stream using the correct biphase encoding, wherein the biphase coding violation is removed. The portion of the data stream with the correct biphase encoding can be output to the network.

Another embodiment of the present invention can include a controller processing data within a network. The controller can include a preamble detector detecting preambles within a data stream of the network, a biphase counter counting biphase units within the data stream, and a block counter counting blocks within the data stream according to a biphase unit count determined by the biphase counter. The controller further can include synchronization logic outputting a synchronization signal indicating whether the controller is synchronized with the data stream according to preambles detected by the preamble detector, the biphase unit count of the biphase counter, and a block count of the block counter.

The controller can include a biphase coding violation detection and correction module detecting biphase coding violations and correcting biphase coding violations detected within frames of the data stream.

The controller can acquire frame lock only after the preamble detector detects two consecutive preambles separated by a number of biphase units corresponding to a frame as determined by the biphase counter with no intervening biphase coding violations as determined by the biphase coding violation detection and correction module.

When the controller is frame locked, the controller can acquire block lock responsive to the preamble detector detecting a first block preamble or a first super block preamble. When the controller is block locked, the controller can acquire super block lock only after the preamble detector detects a super block preamble at a super block boundary within the data stream and a subsequent super block preamble or a wakeup preamble at a next consecutive super block boundary within the data stream as determined according to the biphase counter and the block counter.

Another embodiment of the present invention can include a computer-usable medium having computer-usable instructions written thereon that, when executed by a data processing system, causes the data processing system to perform the various steps and/or functions disclosed herein.

Yet another embodiment of the present invention can include a computer program product including a computer-usable medium having computer-usable program code that, when implemented within a programmable integrated circuit, causes the programmable integrated circuit to perform the various steps and/or functions disclosed herein.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed herein relate to acquiring and maintaining synchronization within a network. More particularly, the embodiments disclosed herein relate to persistent synchronization within a Media Oriented Systems Transport (MOST) network. In accordance with the inventive arrangements disclosed herein, a network interface controller (hereafter "controller") is provided that achieves persistent synchronization by avoiding unnecessary unlocking conditions. The embodiments disclosed herein can be incorporated into one or more nodes of a MOST network.

Within a MOST network, the distance between consecutive preambles within the data stream can be determined by counting the number of biphase units that occur between the consecutive preambles. A controller can achieve and maintain synchronization with the data stream within the MOST network at varying levels, e.g., frame, block, and super block. When frame lock is established, for example, biphase coding violations and preambles that are detected at incorrect locations within the data stream can be ignored for purposes of synchronization. Whereas such events would cause conventional controllers and/or nodes to lose synchronization, these conditions can be identified so as not to cause the loss of synchronization with the data stream. Further, biphase coding violations detected within the data stream can be corrected so as not to cause other nodes in the MOST network to lose synchronization.

The embodiments disclosed herein can be implemented within a programmable integrated circuit (IC). Programmable ICs can be programmed to perform specified logic functions. One type of programmable IC, the field programmable gate array (FPGA), typically includes an array of programmable tiles. Other types of programmable ICs can include Complex Programmable Logic Devices (CPLDs), Programmable Logic Arrays (PLAs), and Programmable Array Logic (PAL) devices. For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell and/or other computer-usable medium.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The term "programmable IC" can refer to the devices disclosed herein as well as devices that are only partially programmable. For example, one type of programmable IC includes a combination of hard-coded transistor logic and a programmable switch fabric that programmably interconnects the hard-coded transistor logic.

An FPGA will be used throughout this specification, by way of example, to better illustrate the various embodiments of the present invention. It should be appreciated, however, that the embodiments disclosed herein can be applied to, or implemented within, other types of programmable ICs as discussed within this specification.

Figure 1:
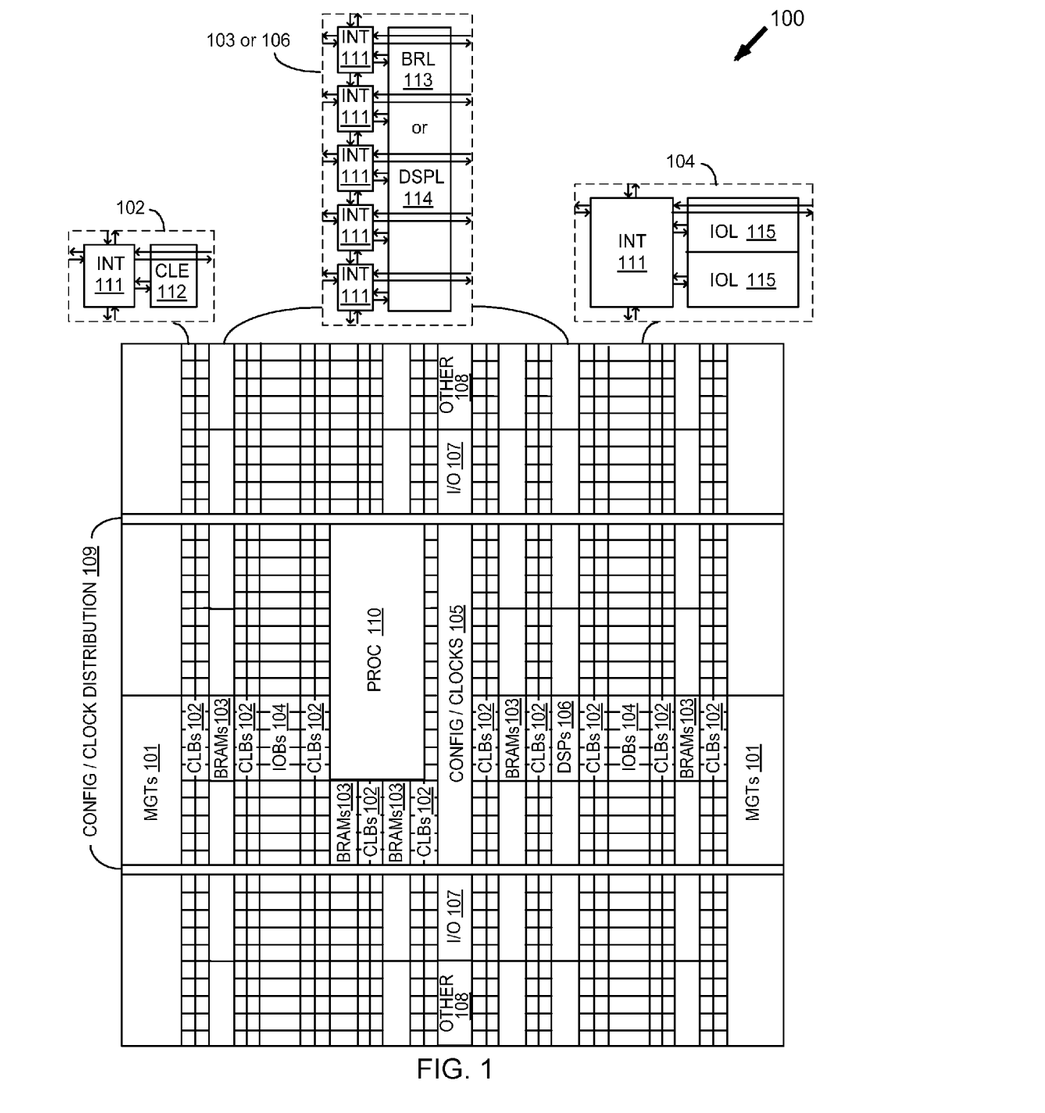
FIG. 1 is a first block diagram illustrating an architecture for a field programmable gate array that can be used to implement a network interface controller (controller) for use within a Media Oriented Systems Transport (MOST) network in accordance with one embodiment of the present invention.

FIG. 1 is a first block diagram illustrating an architecture 100 for an FPGA that can be used to implement a controller for use within a MOST network in accordance with one embodiment of the present invention. An FPGA can include several different types of programmable logic blocks in the array. For example, FIG. 1 illustrates an FPGA architecture 100 that includes a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., configuration ports and clock ports), and other programmable logic 108 such as digital clock managers, analog-to-digital converters, system monitoring logic, and so forth. Some FPGAs also include dedicated processor blocks (PROC) 110.

In some FPGAs, each programmable tile includes a programmable interconnect element (INT) 111 having standardized connections to and from a corresponding interconnect element in each adjacent tile. Therefore, the programmable interconnect elements taken together implement the programmable interconnect structure for the illustrated FPGA. The programmable interconnect element INT 111 also includes the connections to and from the programmable logic element within the same tile, as shown by the examples included at the top of FIG. 1.

For example, a CLB 102 can include a configurable logic element (CLE) 112 that can be programmed to implement user logic plus a single programmable interconnect element INT 111. A BRAM 103 can include a BRAM logic element (BRL) 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element (DSPL) 114 in addition to an appropriate number of programmable interconnect elements. An IOB 104 can include, for example, two instances of an input/output logic element (IOL) 115 in addition to one instance of the programmable interconnect element INT 111. As will be clear to those of skill in the art, the actual I/O pads connected, for example, to the I/O logic element 115 typically are not confined to the area of the I/O logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

FIG. 1 is intended to illustrate only an exemplary FPGA architecture. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. In an actual FPGA, more than one adjacent column of CLBs may be included wherever the CLBs appear, to facilitate the efficient implementation of user logic. The number of adjacent CLB columns can vary with the overall size of the FPGA.

Figure 2:
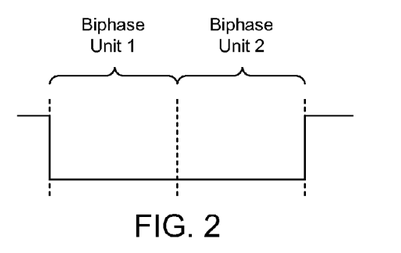
FIG. 2 is a first signal diagram illustrating biphase encoding of a zero bit within a MOST network when the prior biphase unit is high.

FIG. 2 is a first signal diagram illustrating biphase encoding of a zero bit within a MOST network when the prior biphase unit is high. In general, a zero bit is encoded by keeping the signal constant, e.g., either low or high, for two consecutive biphase units. Each bit is set off from each other bit within the data stream by a transition from either low to high or from high to low. Accordingly, when the biphase unit immediately preceding a zero bit is high, as pictured in FIG. 2, the zero bit is encoded by transitioning the signal from high to low at the bit boundary. The signal remains low for two consecutive biphase units. As shown, the signal remains low through both of biphase units 1 and 2.

Figure 3:
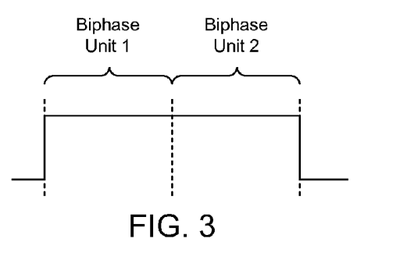
FIG. 3 is a second signal diagram illustrating biphase encoding of a zero bit within a MOST network when the prior biphase unit is low.

FIG. 3 is a second signal diagram illustrating biphase encoding for a zero bit within a MOST network when the prior biphase unit is low. When the biphase unit immediately preceding the zero bit is low, the zero bit can be encoded by transitioning the signal from low to high at the bit boundary. The signal remains high for two consecutive biphase units, e.g., throughout both of biphase units 1 and 2.

Figure 4:
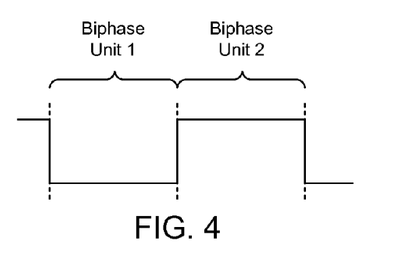
FIG. 4 is a third signal diagram illustrating biphase encoding of a one bit within a MOST network when the prior biphase unit is high.

FIG. 4 is a third signal diagram illustrating biphase encoding for a one bit within a MOST network when the prior biphase unit is high. In general, a one bit is encoded using one biphase unit that is high and another biphase unit that is low. Whether the signal begins high and transitions low or begins low and transitions high will depend upon the biphase unit immediately preceding the one bit. When the biphase unit immediately preceding the one bit is high, the one bit can be encoded by transitioning the signal from high to low at the bit boundary. The signal remains low throughout biphase unit 1. The signal then transitions high and remains high throughout biphase unit 2.

Figure 5:
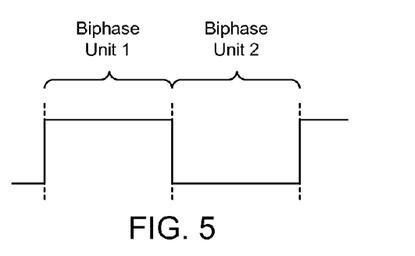
FIG. 5 is a fourth signal diagram illustrating biphase encoding of a one bit within a MOST network when the prior biphase unit is low.

FIG. 5 is a fourth signal diagram illustrating biphase encoding for a one bit within a MOST network when the prior biphase unit is low. When the biphase unit immediately preceding the one bit is low, the one bit can be encoded by transitioning the signal from low to high at the bit boundary and remaining high throughout biphase unit 1. The signal then can transition low and remain low throughout biphase unit 2.

Figure 6:
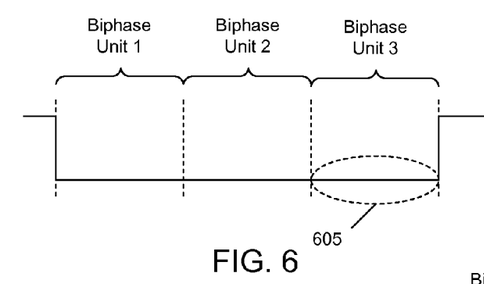
FIG. 6 is a fifth signal diagram illustrating an example of a biphase coding violation.

FIG. 6 is a fifth signal diagram illustrating an example of a biphase coding violation. As noted, to demarcate bits within the data stream of a MOST network, the signal transitions from either high to low or from low to high at the beginning of each biphase unit pair that encodes a bit, e.g., at each bit boundary. When the signal remains constant, e.g., either high or low, for more than two consecutive biphase units or does not transition at a bit boundary, a biphase coding violation results. FIG. 6 illustrates the case where the signal remains low throughout biphase units 1, 2, and 3. Portion 605 of the signal violates the biphase encoding scheme.

Figure 7:
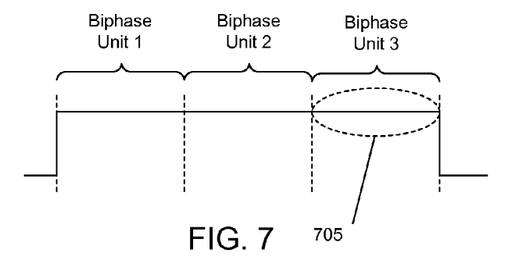
FIG. 7 is a sixth signal diagram illustrating another example of a biphase coding violation.

FIG. 7 is a sixth signal diagram illustrating another example of a biphase coding violation. Whereas FIG. 6 illustrates a biphase coding violation with the signal low, FIG. 7 illustrates a biphase coding violation with the signal high. As shown, the signal remains high throughout biphase units 1, 2, and 3. Portion 705 of the signal violates the biphase coding scheme.

As noted, another example of a biphase coding violation occurs when the signal remains constant across the boundary between two biphase encoded bits. The signal must transition between the second biphase unit of an encoded bit and the first biphase unit of a next encoded bit. Thus, the biphase unit sequences 1001 and 0110 are also examples of biphase coding violations where the signal does not transition between the second and third biphase units, which corresponds to the boundary between two biphase encoded bits.

Figure 8:
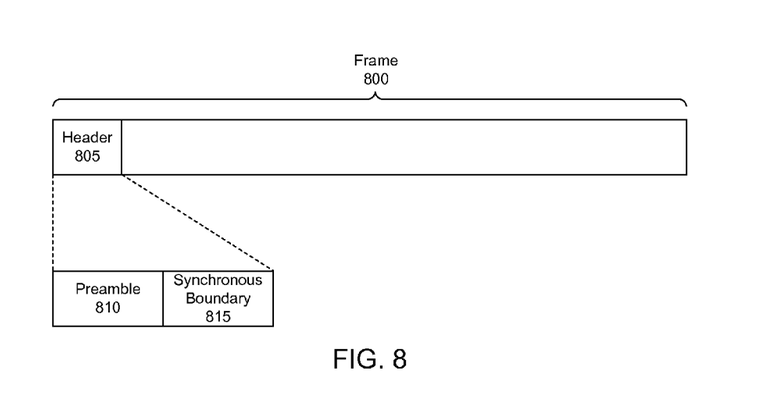
FIG. 8 is a second block diagram illustrating a frame within a data stream of a MOST network.

FIG. 8 is a second block diagram illustrating a frame 800 within a data stream of a MOST network. Each frame, such as frame 800, within a data stream of a MOST network is composed of 64 bytes. Each frame includes a one byte header, such as header 805. The header 805 further can be subdivided into a preamble 810 and a synchronous boundary 815. The preamble 810, which is four bits in length, generally marks a boundary that divides one frame from another frame. Each preamble, such as preamble 810, will include a particular bit pattern identifying that portion of the frame as a preamble. For example, a preamble may include special encoding, e.g., a biphase coding violation or a predetermined bit pattern, that allows each node within the MOST network to identify that portion of the frame as a preamble. The synchronous boundary 815, which is also four bits in length, indicates the beginning of synchronous data (not illustrated) within frame 800. Frame 800 also can include asynchronous data (not illustrated).

A data stream within a MOST network will include several different types of preambles. For example, such a data stream can include frame preambles, block preambles, super block preambles, and wakeup preambles. Each frame preamble is used to set off one frame from another and is, therefore, located at a frame boundary. As noted, each frame is 64 bytes. Accordingly, each frame boundary will occur at 64 byte intervals within the data stream. In general, each frame preamble will occur at each frame boundary, except as noted herein. The block preamble is used to set off one block from another and is located at a block boundary. Each block includes 16 frames. Accordingly, each block boundary will occur at 16 frame intervals within the data stream. In general, each block preamble will occur at each block boundary except as noted herein.

When a block preamble is expected within the data stream, the block preamble can be used in lieu of, e.g., replace, a frame preamble. The super block preamble sets off one super block from another and is located at a super block boundary. A super block includes 64 blocks. At the boundary of a super block within the data stream, a super block preamble can replace a block preamble. A wakeup preamble also can replace a super block preamble. A super block boundary will occur at 64 block intervals within the data stream. In general, a super block preamble will occur at each super block boundary, except as noted herein. Each of the different types of preambles can be distinguished from one another according to the special encoding used.

Figure 9:
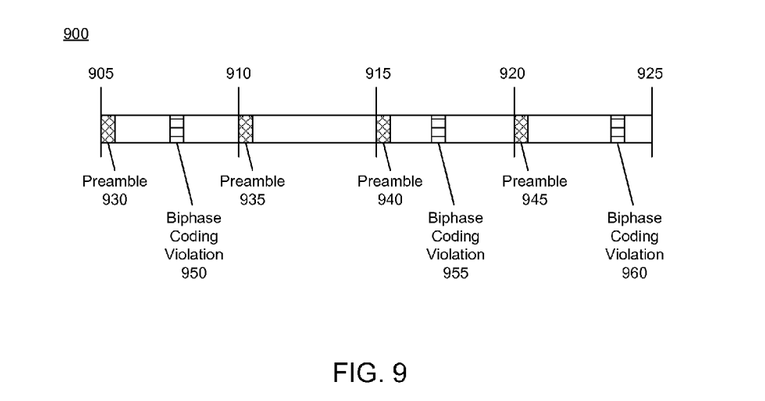
FIG. 9 is a third block diagram illustrating the detection of preambles within a data stream of a MOST network in accordance with another embodiment of the present invention.

FIG. 9 is a third block diagram illustrating the detection of preambles within a data stream 900 of a MOST network in accordance with another embodiment of the present invention. More particularly, FIG. 9 illustrates a technique for acquiring frame lock that can be used within a controller configured in accordance with the embodiments of the present invention. FIG. 9 illustrates that once the controller acquires frame lock, biphase coding violations can be handled in a manner that does not cause the controller to lose frame lock on the data stream.

As shown, each frame boundary 905, 910, 915, 920, and 925 of the data stream 900 is indicated or identified through the existence of a preamble, e.g., preambles 930, 935, 940, and 945. In one embodiment, the controller can acquire frame lock only after detecting two consecutive preambles that are separated by a number of biphase units corresponding to a frame. Further, frame lock is only acquired after the second of the two consecutive preambles is detected without any intervening biphase coding violations having been detected between the first preamble and the second preamble.

While monitoring the data stream 900, the controller can detect preamble 930. The controller next can detect biphase coding violation 950. Subsequently, the controller can detect preamble 935. Although preambles 930 and 935 may each be located at a frame boundary, e.g., separated by 1024 biphase units, the controller does not acquire frame lock on the data stream 900 due to the existence of intervening biphase coding violation 950.

The controller can continue monitoring data stream 900 after detection of preamble 935. The controller can detect preamble 940 after preamble 935 and further determine that preambles 935 and 940 are separated by a number of biphase units that corresponds to a frame, e.g., 1024. In this case, because no biphase coding violation was detected between preambles 935 and 940, e.g., no intervening biphase coding violation was detected, the controller can acquire frame lock on the data stream 900. Responsive to acquiring frame lock, a synchronization signal can be output or changed, e.g., toggled from low to high or from high to low as the case may be, to indicate that the controller has acquired frame lock on data stream 900.

As used herein, "outputting" and/or "output" can mean, for example, writing to a file, writing to a user display or other output device, playing audible notifications, sending or transmitting signals to another system or node within a network, exporting, generating a signal, sending or transmitting a signal, or the like. In the present specification, the same reference characters may be used to refer to terminals, signal lines, wires, and their corresponding signals. Accordingly, the terms "signal," "wire," "connection," "terminal," and "pin" may be used interchangeably, from time-to-time, within the present specification.

By not acquiring frame lock until two consecutive preambles separated by 1024 biphase units are detected without any intervening biphase coding violations, a more robust and persistent synchronization can be achieved. The controller can continue to count the number of biphase units that occur between consecutive preambles to better distinguish between valid preambles, invalid preambles, and biphase coding violations. Once frame lock is acquired, counting biphase units helps to ensure that invalid preambles, e.g., preambles not located at a frame boundary, or biphase coding violations do not cause the controller to lose frame lock on the data stream 900.

For example, after detecting preamble 940, the controller can detect biphase coding violation 955. Since the biphase unit count maintained by the controller will not be at 1024 when biphase coding violation 955 is detected, the controller can ignore biphase coding violation 955. In another embodiment, an error correction technique can be applied in cases where a biphase coding violation such as biphase coding violation 955 is detected within a frame of the data stream, e.g., not at frame boundary 920. In any case, the controller can maintain frame lock on data stream 900 according to preamble 940.

The controller can continue to monitor data stream 900 and detect preamble 945. Preamble 945 will be detected when the biphase unit count is 1024, corresponding to frame boundary 920. Accordingly, the controller will maintain frame lock. When biphase coding violation 960 is detected, again, the biphase unit count will not be 1024 as biphase coding violation 960 occurs within the frame and not at frame boundary 925. Again, the biphase coding violation 960 can be ignored for purposes of synchronization and optionally be corrected.

Conventional nodes detect biphase coding violations and mistakenly presume such biphase coding violations to be preambles. This causes conventional nodes to lose frame lock. In order for nodes within a MOST network to operate at full functionality, each node must not only maintain frame lock, but also maintain block lock and super block lock. When frame lock is lost, the synchronization error is propagated through the nodes in the MOST network, causing each node to lose synchronization. When frame lock is lost, any other level of synchronization, e.g., block lock or super block lock, also will be lost.

The time required for conventional nodes to reacquire synchronization at all necessary levels, e.g., frame, block, and super block, can be time consuming and processing resource intensive. While this occurs, the end user typically experiences a drop out in video, audio, or the particular media or content that is currently being played or distributed over the MOST network.

The embodiments disclosed herein employ a biphase counter to determine the location, with respect to frame boundaries, of any biphase coding violations that may be detected. When biphase coding violations, or other special encoding, are detected in a location that does not correspond to a frame boundary, such encoding can be ignored or corrected. A controller configured in accordance with the embodiments disclosed herein will not lose frame lock upon detecting, for example, biphase coding violations presuming that two consecutive preambles have been detected that are separated by 1024 biphase units without any intervening biphase coding violations. By enforcing this restriction, synchronization can be achieved without false starts, e.g., first attempting to synchronize to a biphase coding violation that is not a valid preamble.

It should be appreciated that the example illustrated with respect to FIG. 9 is also applicable when a preamble is detected within a frame, but not at a frame boundary. That is, a preamble detected at a location that is not a frame boundary is likely a data corruption that coincidentally resembles one of the preambles described herein. In that regard, the preamble can be ignored for purposes of synchronizing and optionally be processed through an error correction technique.

Figure 10:
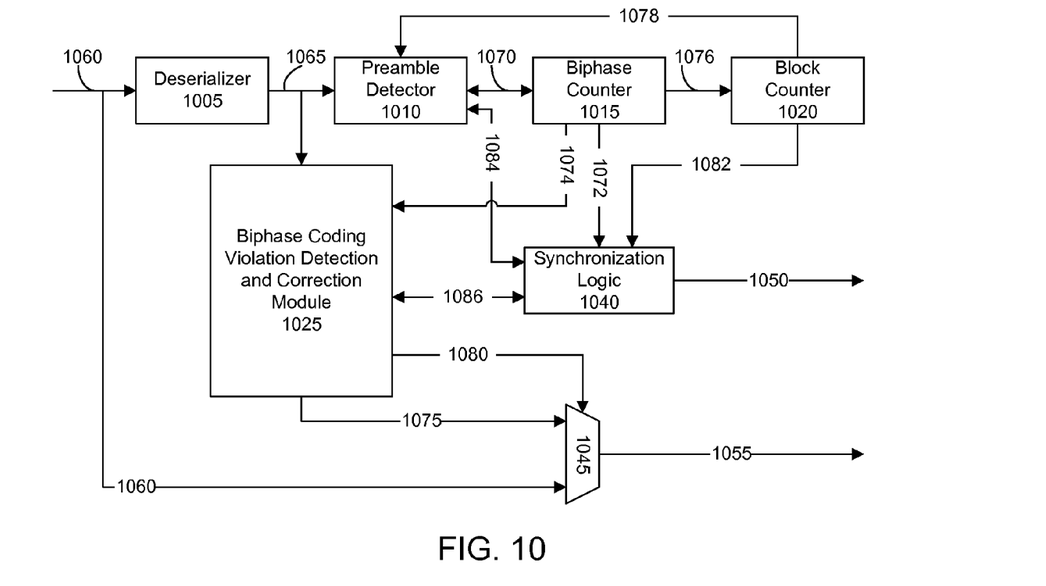
FIG. 10 is a fourth block diagram illustrating a controller for a MOST network in accordance with another embodiment of the present invention.

FIG. 10 is a fourth block diagram illustrating a controller 1000 for a MOST network in accordance with another embodiment of the present invention. The controller 1000 can be implemented within a programmable IC such as an FPGA or the like. In this regard, the controller 1000 also may be implemented in the form of, or specified as, a "core."

A core refers to a block that has a pre-designed functionality. For example, a core can include a predetermined set of configuration bits that program a programmable IC to implement a circuit design, or a portion of a circuit design, to perform one or more functions as described herein. Alternatively, a core can include source code or schematics that describe the logic and connectivity of a design or portion of a design that implements the various tasks and/or functions described herein. Typical cores can provide, but are not limited to, digital signal processing (DSP) functions, memories, storage elements, and math functions. Some cores include an optimally floorplanned layout targeted to a specific family of programmable ICs. Cores can also be parameterizable, i.e., allowing the user to enter parameters to activate or change certain core functionality.

As shown, the controller 1000 can include a deserializer 1005, a preamble detector 1010, a biphase counter 1015, and a block counter 1020. The controller 1000 further can include a biphase coding violation detection and correction module (BCVDCM) 1025. Synchronization logic 1040 can be included as well as a multiplexer 1045.

The deserializer 1005 can receive a signal 1060. Signal 1060 can be, or specify, a data stream such as a serial, MOST data stream. As shown, signal 1060 is also provided to the multiplexer 1045. The deserializer 1005 can convert signal 1060 into a signal 1065. Signal 1065 can be an 8-bit, parallel data stream. As shown, the deserializer 1005 can output signal 1065 to the preamble detector 1010 and the BCVDCM 1025.

The preamble detector 1010 can compare data from signal 1065 with the different types of preambles used within the MOST network. For example, the preamble detector 1010 can be programmed or configured with the different types of preambles described herein. Accordingly, the preamble detector 1010 can determine when any portion of signal 1065 matches one of the preambles described herein.

The preamble detector 1010 can communicate with the biphase counter 1015 via bidirectional signal 1070. The biphase counter 1015 can continually count biphase units received within signal 1070. Based upon a count of biphase units maintained within the biphase counter 1015, e.g., the biphase unit count, the biphase counter 1015 can notify the preamble detector 1010 when preambles are expected to be detected, e.g., through signal 1070. For example, the biphase counter 1015 can count biphase units and notify the preamble detector 1010 when a frame boundary occurs, e.g., when the biphase unit count reaches 1024.

The biphase counter 1015, as shown, further can notify the synchronization logic 1040 via signal 1072 and the BCVDCM 1025 via signal 1074 of the biphase unit count or when a frame boundary occurs. The biphase counter 1015 also can communicate with the block counter 1020 through signal 1076 and notify the block counter 1020 of the number of frames that have been detected or, alternatively, provide the block counter 1020 with the biphase unit count. For example, after counting 1024 biphase units, the biphase counter 1015 can trigger the block counter 1020 to increment by one through signal 1076. The biphase counter 1015 then can be reset to begin counting a next set of 1024 biphase units.

The block counter 1020 can maintain a count of detected frames, e.g., a frame count. In this manner, the block counter 1020 can be configured to count frames and determine when 16 frames have been counted. Since 16 frames forms a block, the block counter 1020, responsive to detecting a block boundary, e.g., counting 16 frames, can notify the preamble detector 1010, through signal 1078, and the synchronization logic 1040, through signal 1082, that a block boundary has been detected. The block counter 1020 further can count blocks and determine when a super block boundary is expected or detected and notify the preamble detector 1010 and/or the synchronization logic 1040.

The preamble detector 1010 can determine the type of preamble that is to be expected at any given time based upon the notifications, biphase unit count, and/or frame count received from the biphase counter 1015 and/or the block counter 1020. Accordingly, the preamble detector 1010 can determine whether a frame preamble, a block preamble, a super block preamble, or a wakeup preamble is expected or allowed at each respective frame boundary, block boundary, and/or super block boundary.

The synchronization logic 1040 can output a synchronization status signal 1050 indicating whether synchronization has been achieved. For example, the synchronization logic 1040 can generate a low synchronization status signal 1050 when frame lock has not been acquired. The synchronization logic 1040 can generate a high, or transition the signal high, when frame lock has been acquired. It should be appreciated that the synchronization status signal 1050 can indicate other states of synchronization or lock. For example, the synchronization logic 140 can alter or modify the synchronization status signal 1050 to indicate that block lock has been acquired and/or lost and that super block lock has been acquired or lost.

The preamble detector 1010 can output signal 1084 to the synchronization logic 1040 indicating when two consecutive preambles have been detected that are separated by 1024 biphase units. The preamble detector 1010 can determine the distance between two or more consecutive preambles according to the biphase counter 1015 and/or the clock counter 1020.

The BCVDCM 1025 can detect biphase coding violations within the data stream 1065 with the aid of the biphase counter 1015. When a biphase coding violation is detected, e.g., one occurring at a location other than a frame boundary, BCVDCM 1025 can output a signal, e.g., through bidirectional signal 1086, to the synchronization logic 1040 that indicates that a biphase coding violation has been detected. Accordingly, the synchronization logic 1040 can generate the synchronization status signal 1050 to indicate that frame synchronization is achieved when two consecutive preambles are detected at frame boundaries without any intervening biphase coding violations as determined by the BCVDCM 1025. Thus, depending upon the circumstances under which a biphase coding violation is detected, the controller will maintain synchronization or be prevented from acquiring synchronization.

The BCVDCM 1025 further can correct biphase coding violations detected within the data stream 1065 and, thus, data stream 1060. When the BCVDCM 1025 detects a biphase coding violation, the BCVDCM 1025 can correct the biphase coding violation. The BCVDCM 1025 can generate a corrected serial data stream 1075 that can be provided to the multiplexer 1045. The BCVDCM 1025 can generate a control signal 1080 that is provided to the multiplexer 1045. The control signal 1080 instructs the multiplexer 1045 to pass either the original data stream 1060 or the corrected data stream 1075 based upon whether a biphase coding violation has been detected and corrected. Accordingly, the multiplexer 1045 can output the serial data stream 1055 that will include the original data stream 1060 with any interspersed portions of corrected data stream 1075 in accordance with detected biphase coding violations. The biphase coding violations detected within data stream 1060 will be removed and will not be present within the data stream 1055.

It should be appreciated that the synchronization logic 1040 can determine whether block and super block lock also have been established using the various biphase counts as described with reference to FIG. 10. Accordingly, as noted, the synchronization status signal 1050 can be modified as may be required to indicate the acquisition of frame, block and/or super block lock or the loss of such lock(s).

Figure 11:
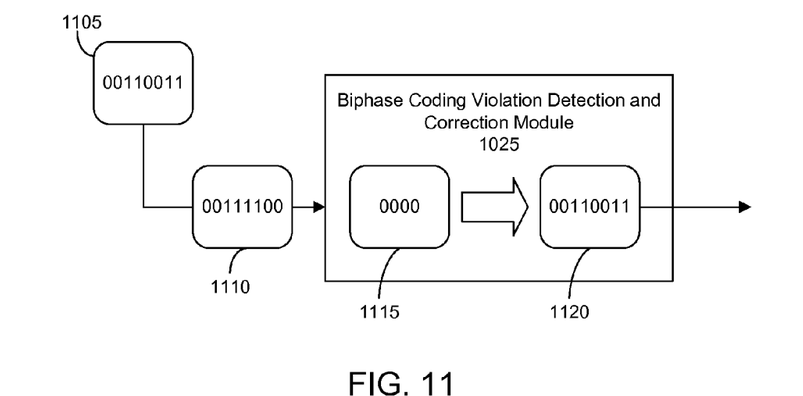
FIG. 11 is a fifth block diagram illustrating the correction of biphase coding violations in accordance with another embodiment of the present invention.

FIG. 11 is a fifth block diagram illustrating the correction of biphase coding violations in accordance with another embodiment of the present invention. FIG. 11 illustrates one technique that can be utilized by the BCVDCM 1025 to correct biphase coding violations. Accordingly, FIG. 11 illustrates the progression of a portion of a data stream within the MOST network as that portion of the data stream moves through the BCVDCM 1025 and is corrected.

As shown, a portion of the data stream, referred to as data 1105, can be propagated through the MOST network. For purposes of illustration, data 1105 represents four bits of data and, thus, eight biphase units. It should be appreciated that the portion of data that can be detected as including a biphase coding violation may be smaller or larger than four bits. Accordingly, the embodiments disclosed herein are not intended to be limited by the particular examples presented.

Data 1105 can represent original data without any corruption. At some point during transmission of the data through the network, prior to being received by the controller, or a node including a controller as described herein, data 1105 can be corrupted resulting in data 1110. As pictured, data 1110 includes four consecutive biphase units that are high, e.g., ones. Data 1110 will be detected as a biphase coding violation by the BCVDCM 1025.

The BCVDCM 1025 can decode the corrupted data, e.g., data 1110. Data 1110 can be decoded as bits "0000," pictured as data 1115. In effect, each pair of either zeroes or ones is interpreted as an intended zero bit. While data 1110 has a biphase coding violation, each pair of biphase units can be evaluated individually, where any transitions that are to exist between encoded bits are ignored. For example, the BCVDCM 1025 can decode biphase units 1-2, which are "00," as a zero bit. BCVDCM 1025 can decode biphase units 3-4, which are "11," as a zero bit. Similarly, biphase units 5-6, which are "11," can be decoded as a zero bit and biphase units 7-8, which are "00," can be decoded as a zero bit. In this regard, a "10" or a "01" can be interpreted as a one bit and transitions separating bits of the data stream that may be missing can be ignored.

The BCVDCM 1025 can biphase encode the decoded data as data 1120, which is "00110011." Data 1120 is a correct biphase encoding of decoded data 1115. As such, biphase encoded data 1120 includes no biphase coding violations. Data 1120 can be output from the BCVDCM 1025 and provided to the multiplexer 1045. Additionally, BCVDCM 1025 can output the control signal 1080 which will cause the multiplexer 1045 to pass data 1120 rather than data 1110 to the next node in the MOST network. In this manner, biphase coding violations can be removed from the data stream to prevent other nodes within the network from losing synchronization or prevent such nodes from propagating corrupt data.

Figure 12A:
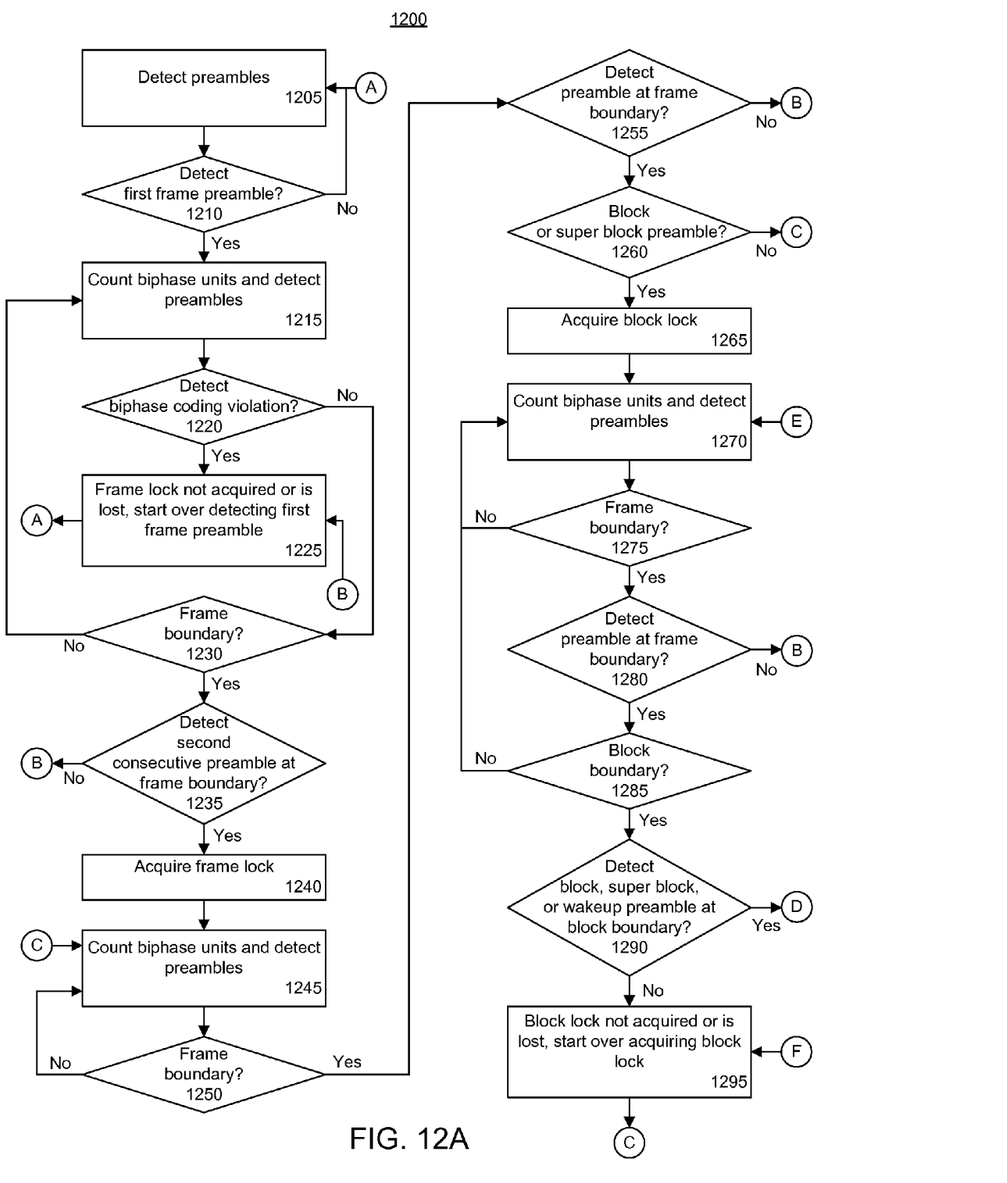
FIGS. 12A and 12B, taken collectively, form a flow chart illustrating a method of acquiring and maintaining synchronization within a MOST network in accordance with another embodiment of the present invention.
Figure 12B:
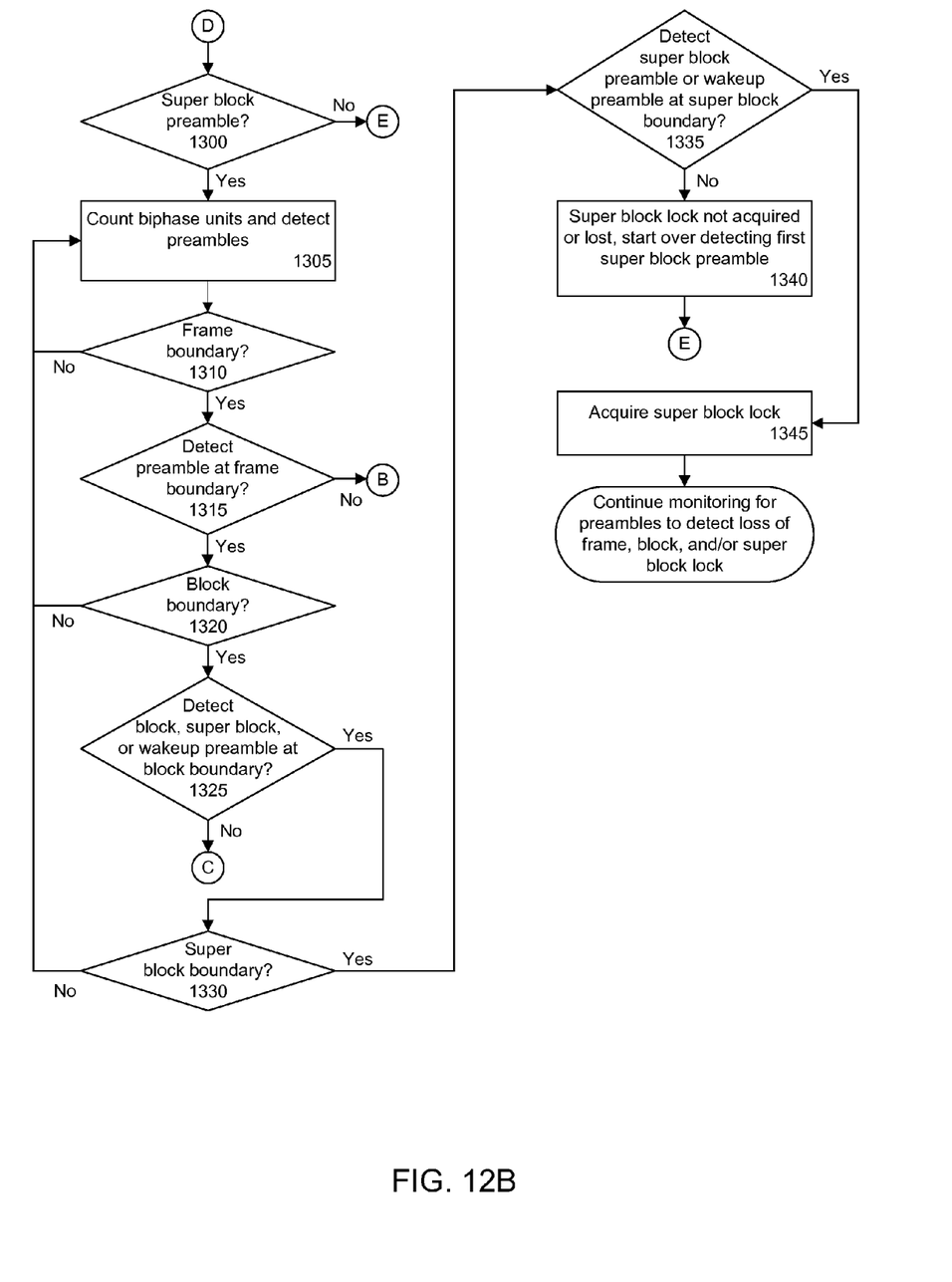

FIGS. 12A and 12B, taken collectively, form a flow chart illustrating a method 1200 of acquiring and maintaining synchronization within a MOST network in accordance with another embodiment of the present invention. The method 1200 can be implemented using a controller as described. Beginning in step 1205, the controller can begin detecting preambles. In step 1210, the controller can determine whether a first preamble has been detected. The first preamble may be a frame preamble, a block preamble, a super block preamble, or a wakeup preamble. If a first preamble is detected, the method can proceed to step 1215. If not, the method can loop back to step 1205 to continue detecting preambles.

Proceeding with step 1215, the controller can continue to count biphase units and detect preambles. In step 1220, the controller can determine whether a biphase coding violation has been detected. If so, the method can proceed to step 1225. If not, the method can continue to step 1230.

When the controller detects a biphase coding violation after detecting the first preamble and before detecting a second preamble, the controller does not acquire frame lock. As noted, the controller does not acquire frame lock until such time that two consecutive preambles are detected that are separated by a number of biphase units corresponding to a frame without any intervening biphase coding violations. Accordingly, in step 1225, the controller does not acquire frame lock. As noted, a synchronization status signal can be output that indicates whether frame lock was acquired. The controller starts over detecting preambles, e.g., monitoring for a first preamble. That is, the first preamble detected in step 1210 can be ignored and the process of detecting two consecutive preambles can be started anew with a count of zero preambles being detected. As shown, the method can loop back to step 1205 to continue processing.

In step 1230, when no biphase coding violation is detected, the controller can determine whether a frame boundary has been detected according to the biphase unit count that is maintained. If a frame boundary is detected, the method can proceed to step 1235. If not, the method can loop back to step 1215 to continue counting biphase units and detecting preambles.

In step 1235, the controller can determine whether a second consecutive preamble is detected at the frame boundary. That is, the controller can determine whether a second consecutive preamble is detected that is separated from the first preamble by a number of biphase units corresponding to a frame, e.g., 1024 biphase units. The second preamble may be a frame preamble, a block preamble, a super block preamble, or a wakeup preamble. If a second preamble is detected at the frame boundary, the method can continue to step 1240. If not, the method can loop back to step 1225, where frame lock is not acquired and the controller can begin the process of acquiring frame lock anew. The controller begins detecting a first preamble as if the first preamble had not previously been detected.

In step 1240, after detecting two consecutive preambles separated by 1024 biphase units without any intervening biphase coding violations, the controller can acquire frame lock. In step 1245, the controller can continue to count biphase units and detect preambles. In step 1250, the controller can determine whether a frame boundary has been detected according to the biphase unit count. If so, the method can continue to step 1255. If not, the method can loop back to step 1245 to continue processing.

In step 1255, the controller can determine whether a preamble has been detected at the frame boundary. If not, the method can loop back to step 1225, where frame lock is lost and the process of acquiring frame lock can begin anew. If a preamble is detected at the frame boundary, the method can proceed to step 1260. When the controller is frame locked and does not detect a preamble at a frame boundary, the controller loses frame lock. If, however, a preamble, whether an actual preamble or corrupt data having a biphase coding violation, is detected within a frame, e.g., not at a frame boundary, the controller will not lose frame lock.

In step 1260, the controller can determine whether the preamble detected at the frame boundary is a block preamble or a super block preamble. If not, the method can loop back to step 1245, to continue counting biphase units and detecting preambles. If the detected preamble is a block preamble or a super block preamble, the method can continue to step 1265 where the controller can acquire block lock on the data stream. When frame locked, the controller can lock to a block upon detecting a block preamble or a super block preamble. The controller can lock to the next detected block preamble or super block preamble when frame locked without waiting to detect two consecutive block preambles, or two consecutive preambles that are formed of a combination of a block preamble and a super block preamble. Once block lock is acquired, the controller can process all parts of a frame and a block of the data stream. As noted, the synchronization status signal that is output can indicate that block lock has been acquired.

In step 1270, the controller can continue to count biphase units and detect preambles. In step 1275, the controller can determine whether a frame boundary has been detected according to the biphase unit count. If so, the method can continue to step 1280. If not, the method can loop back to step 1270 to continue processing.

In step 1280, the controller can determine whether a preamble has been detected at the frame boundary. If so, the method can proceed to step 1285. If not, the method can loop back to step 1225 where frame lock is lost. It should be appreciated that when frame lock is lost, each other type of lock or synchronization that exists at levels above the frame level also is lost. For example, if frame lock and block lock have been acquired and frame lock is lost, e.g., a preamble is not detected at a frame boundary, then both frame lock and block lock will be lost. Similarly, if frame lock, block lock, and super block lock have been acquired and frame lock is lost, then block lock and super block lock also are lost. By the same token, the loss of block lock will also cause loss of super block lock.

Continuing with step 1285, the controller can determine whether a block boundary has been detected according to the biphase unit count. If so, the method can continue to step 1290. If not, the method can loop back to step 1270 to continue counting biphase units and detecting preambles.

In step 1290, the controller can determine whether a block preamble, a super block preamble, or a wakeup preamble has been detected at the block boundary. If any such preamble is detected, the method can continue to step 1300 in FIG. 12B. If not, the method can continue to step 1295 where block lock is lost and the process of acquiring block lock can be started anew. The synchronization status signal can indicate that block lock was not acquired or was lost.

In step 1300, the controller can determine whether the detected preamble is a super block preamble. If so, the method can continue to step 1305. If not, the method can loop back to step 1270 to continue counting biphase units and detecting preambles. The super block preamble detected in step 1300 can be identified as a first super block preamble. Detection of either a super block preamble or a wakeup preamble at the next super block boundary will allow the controller to acquire super block lock.

Accordingly, in step 1305, the controller can continue to count biphase units and detect preambles. In step 1310, the controller can determine whether a frame boundary has been detected. If not, the method can loop back to step 1305 to continue processing. If so, the method can proceed to step 1315. In step 1315, the controller can determine whether a preamble is detected at the frame boundary. If not, the method can continue to step 1225 where frame lock and block lost are lost. If a preamble is detected at the frame boundary, the method can continue to step 1320 where the controller can determine whether a block boundary has been detected according to the count of biphase units.

If a block boundary has not been detected, the method can loop back to step 1305 to continue processing. If a block boundary has been detected, the method can continue to step 1325 to determine whether a block preamble, a super block preamble, or a wakeup preamble has been detected at the block boundary. If a block preamble, a super block preamble, or a wakeup preamble has not been detected at the block boundary, the method can proceed to step 1295 where block lock is lost. If a block preamble, a super block preamble or a wakeup preamble has been detected at the block boundary, the method can proceed to step 1330 where the controller can determine whether a super block boundary has been detected. If so, the method can proceed to step 1335. If not, the method can loop back to step 1305.

Continuing with step 1335, the controller can determine whether a super block preamble or a wakeup preamble has been detected at the super block boundary. If so, the method can proceed to step 1345. If not, the method can continue to step 1340. In step 1340, where a super block boundary has been detected according to the biphase unit count, and either a super block preamble or a wakeup preamble has not been detected at the super block boundary, super block lock is not acquired. The method can loop back to step 1270 to begin the process of acquiring super block lock anew. The controller will begin to detect the first super block preamble again, e.g., by disregarding the super block preamble detected in step 1300.

In step 1345, when a super block preamble or a wakeup preamble is detected at the super block boundary, the controller can acquire super block lock. With respect to both steps 1340 and 1345, the synchronization status signal can indicate whether super block lock was acquired. After step 1345, the controller can continue to monitor for preambles and counting biphase units to determine whether the appropriate preambles are detected at frame, block, and super block boundaries. When a particular type of preamble is not detected at a boundary, lock, e.g., synchronization, can be lost at the frame, block, or super block level according to the particular boundary at which no preamble or an incorrect preamble is detected.

The flowchart in the figure illustrates the architecture, functionality, and operation of possible implementations of systems, methods and computer program products according to various embodiments of the present invention. In this regard, each block in the flowchart may represent a module, segment, or portion of code, which comprises one or more portions of computer-usable program code that implements the specified logical function(s).

It should be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved.

It also should be noted that each block of the flowchart illustration, and combinations of blocks in the flowchart illustration, can be implemented by special purpose hardware-based systems that perform the specified functions or acts, or combinations of special purpose hardware and computer instructions. For example, the various blocks of the flowchart represent functions that may be implemented by one or more of the various components of the controller disclosed herein. As the flow chart seeks to illustrate the overall functionality of the controller, it is provided for purposes of illustration only.

The quantities in terms of number of bits or bytes in a frame, number of frames in a block, number of blocks in a super block, etc., have been used for purposes of illustration. It should be appreciated that the particular quantities involved may vary according to the particular version of the MOST specification for which a controller configured in accordance with the embodiments disclosed herein is implemented.

Embodiments of the present invention can be realized in hardware, software, or a combination of hardware and software. The embodiments can be realized in a centralized fashion in one data processing system or in a distributed fashion where different elements are spread across several interconnected data processing systems. Any kind of data processing system or other apparatus adapted for carrying out the methods described herein is suited. A typical combination of hardware and software can be a general-purpose computer system with a computer program that, when being loaded and executed, controls the computer system such that it carries out the methods described herein.

A data processing system, e.g., a computer or computer system, suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices such as, for example, keyboards, displays, pointing devices, etc., can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, computer memory, one or more portions of a wired or wireless network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system, hardware description language (HDL), a bitstream for programming an IC, or the like.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A method of processing data for a network, the method comprising:
    detecting, using a controller, a first preamble and a second preamble within a data stream of the network;
    counting biphase units between the first preamble and the second preamble;
    acquiring frame lock on the data stream responsive to determining that the first preamble and the second preamble are separated by a number of biphase units corresponding to a frame; and
    outputting a synchronization signal indicating that frame lock has been acquired responsive to acquiring frame lock on the data stream.

2. The method of claim 1, wherein acquiring frame lock on the data stream further comprises determining that no biphase coding violation is detected within the data stream between the first preamble and the second preamble.

3. The method of claim 1, wherein frame lock has been acquired, the method further comprising:
    detecting a biphase coding violation within the data stream;
    determining that a number of biphase units between the biphase coding violation and a most recent detected preamble located at a frame boundary does not correspond to a frame; and
    maintaining frame lock according to the most recent detected preamble.

4. The method of claim 1, wherein frame lock has been acquired, the method further comprising:
    detecting a block preamble within the data stream; and
    responsive to detecting the block preamble, acquiring block lock on the data stream.

5. The method of claim 1, wherein frame lock has been acquired, the method further comprising:
    detecting a super block preamble within the data stream;
    determining that block lock has not been acquired on the data stream; and
    responsive to detecting the super block preamble, acquiring block lock on the data stream.

6. The method of claim 1, wherein frame lock and block lock have been acquired, the method further comprising:
    detecting a first super block preamble and a second super block preamble within the data stream; and
    acquiring super block lock responsive to determining that the first super block preamble and the second super block preamble are separated by a number of biphase units corresponding to a super block.

7. The method of claim 1, wherein frame lock and block lock have been acquired, the method further comprising:
    detecting a super block preamble and a wakeup preamble within the data stream; and
    acquiring super block lock responsive to determining that the super block preamble and the wakeup preamble are separated by a number of biphase units corresponding to a super block.

8. The method of claim 1, wherein frame lock has been acquired, the method further comprising:
    detecting a biphase coding violation within a frame of the data stream;
    decoding a portion of the data stream comprising the biphase coding violation;
    determining a correct biphase encoding of the portion of the data stream comprising the biphase coding violation;
    biphase encoding the portion of the data stream using the correct biphase encoding, wherein the biphase coding violation is removed; and
    outputting the portion of the data stream with the correct biphase encoding to the network.

9. The method of claim 1, further comprising:
    maintaining frame lock according to the second preamble despite detecting a biphase coding violation occurring a number of biphase units after the second preamble that does not correspond to a frame boundary.

10. A controller that processes data within a network, the controller comprising:
    a preamble detector detecting preambles within a data stream of the network;
    a biphase counter counting biphase units within the data stream;
    a block counter counting blocks within the data stream according to a biphase unit count determined by the biphase counter; and
    synchronization logic outputting a synchronization signal indicating whether the controller is synchronized with the data stream according to preambles detected by the preamble detector, the biphase unit count of the biphase counter, and a block count of the block counter.

11. The controller of claim 10, further comprising a biphase coding violation detection and correction module detecting biphase coding violations and correcting biphase coding violations detected within frames of the data stream.

12. The controller of claim 11, wherein frame lock is acquired only after the preamble detector detects two consecutive preambles separated by a number of biphase units corresponding to a frame as determined by the biphase counter with no intervening biphase coding violations as determined by the biphase coding violation detection and correction module.

13. The controller of claim 12, wherein the controller is frame locked, wherein block lock is acquired responsive to the preamble detector detecting a first block preamble or a first super block preamble.

14. The controller of claim 13, wherein the controller is block locked, wherein super block lock is acquired only after the preamble detector detects a super block preamble at a super block boundary within the data stream and a subsequent super block preamble or a wakeup preamble at a next consecutive super block boundary within the data stream as determined according to the biphase counter and the block counter.

15. A non-transitory computer-readable medium having written thereon instructions for executing a method of processing data within a controller for a network, the method comprising:
    detecting a first preamble and a second preamble within a data stream of the network;

counting biphase units between the first preamble and the second preamble;

acquiring frame lock on the data stream responsive to determining that the first preamble and the second preamble are separated by a number of biphase units corresponding to a frame; and outputting a synchronization signal indicating that frame lock has been acquired responsive to acquiring frame lock on the data stream.

16. The computer-readable medium of claim 15, wherein acquiring frame lock on the data stream further comprises determining that no biphase coding violation is detected within the data stream between the first preamble and the second preamble.

17. The computer-readable medium of claim 15, wherein frame lock has been acquired, the instructions written thereon further comprising:

detecting a biphase coding violation within the data stream;

determining that a number of biphase units between the biphase coding violation and a most recent detected preamble located at a frame boundary does not correspond to a frame; and maintaining frame lock according to the most recent detected preamble.

18. The computer-readable medium of claim 15, wherein frame lock has been acquired, the instructions written thereon further comprising:

detecting a block preamble or a super block preamble within the data stream; and acquiring block lock on the data stream.

19. The computer-readable medium of claim 15, wherein frame lock and block lock have been acquired, the instructions written thereon further comprising:

detecting a first super block preamble;

detecting a second super block preamble or a wakeup preamble within the data stream; and acquiring super block lock responsive to determining that the first super block preamble and the second super block preamble, or the first super block preamble and the wakeup preamble, are separated by a number of biphase units corresponding to a super block.

20. The computer-readable medium of claim 15, wherein frame lock has been acquired, the instructions written thereon further comprising:

maintaining frame lock according to the second preamble responsive to detecting a biphase coding violation occurring a number of biphase units after the second preamble that does not correspond to a frame boundary.

* * * * *